United States Patent

[11] 3,617,483

| [72] | Inventors | Edward T. Child<br>Fishkill;<br>Reese A. Peck, Fishkill; Donald A. Messing, Wappingers Falls, all of N.Y. |
|---|---|---|
| [21] | Appl. No. | 724,286 |
| [22] | Filed | Apr. 25, 1968 |
| [45] | Patented | Nov. 2, 1971 |
| [73] | Assignee | Texaco Inc.<br>New York, N.Y. |

[54] HYDROCRACKING PROCESS
8 Claims, No Drawings

[52] U.S. Cl. .................................................. 208/59,
208/89, 208/111, 252/455 Z
[51] Int. Cl. .......................................................... C10g 37/02,
B01j 11/22
[50] Field of Search ........................................ 208/59,
111, 89

[56] References Cited
UNITED STATES PATENTS

| 3,267,022 | 8/1966 | Hansford | 208/111 |
|---|---|---|---|
| 3,472,758 | 10/1969 | Stine et al. | 208/59 |
| 3,499,835 | 3/1970 | Hansford | 208/111 |
| 3,509,040 | 4/1970 | McKinney | 208/59 |
| 3,140,251 | 7/1964 | Plank et al. | 208/120 |
| 3,254,017 | 5/1966 | Arey et al. | 208/59 |
| 3,132,087 | 5/1964 | Kelley et al. | 208/60 |

*Primary Examiner*—Delbert E. Gantz
*Assistant Examiner*—G. E. Schmitkons
*Attorneys*—K. E. Kavanagh, Thomas H. Whaley and Robert Knox, Jr.

ABSTRACT: A two-stage hydrocracking process for the conversion of heavy hydrocarbon fractions containing at least 50 p.p.m. nitrogen into lighter products using in both stages a catalyst containing a hydrogenating component supported on a mixture of a modified crystalline zeolite and at least one amorphous inorganic oxide.

HYDROCRACKING PROCESS

This invention relates to a hydrocarbon conversion process. More particularly it is concerned with the conversion of heavy hydrocarbon fractions into lighter more valuable products by hydrocracking.

Hydrocracking is now well-known in petroleum refining and has attained considerable commercial success. However, the process as currently practiced has several disadvantages, in particular the number of reaction vessels and the volume of catalyst required. In conventional commercial hydrocracking processes, it is customary to have at least two reactors, the first for hydrotreating and the ensuing reactor or reactors for hydrocracking. Each of the reactors involved contains a catalyst, the catalytic hydrotreating reactor frequently being referred to as a guard chamber since its function is to protect the hydrocracking catalyst from deactivating materials and poisons.

Hydrocracking catalysts generally are bifunctional and contain two components, a hydrogenating component supported on a cracking component. It is well-known that cracking catalysts should be acidic as this quality enhances the cracking activity and accordingly it has been accepted that the supports for hydrocracking catalysts should also be acidic to promote the cracking portion of the hydrocracking reaction. One of the disadvantages of petroleum hydrocracking processes as currently practiced is that the conventional catalysts are rapidly deactivated when petroleum fractions containing undesirably high concentrations of nitrogen and/or polycyclic aromatics are brought into contact with the hydrocracking catalyst.

During the course of the hydrocracking reaction the organic nitrogen may, because in some instances of its basic nature, attack the acidic sites of the cracking component thereby neutralizing the acidity of the catalyst and causing a rapid deactivation in the cracking activity of the catalyst. It is also quite likely that the organic nitrogen compounds are decomposed under hydrocracking conditions with the formation of ammonia which, too, will attack the acidic sites of the cracking component thereby causing additional loss of catalyst activity. Unfortunately as acid sites of the cracking component are neutralized it becomes necessary to increase the reaction temperature to obtain the required conversion. However, as the temperature is increased the product distribution becomes unsatisfactory and it is necessary to shut down the process and to regenerate or even in some instances replace the catalyst. For the foregoing reasons then it is conventional in hydrocracking processes to precede the hydrocracking unit with a hydrotreating unit wherein the organic nitrogen can be converted to ammonia which is separated from the feed stream to the hydrocracking unit. More recently, catalysts have been developed which are more resistant to ammonia than were earlier catalysts and with some of these later-developed catalysts it is no longer necessary to carry out a separation between the hydrotreating and the hydrocracking zones. Even so, these new catalysts are still not completely satisfactory for hydrocracking purposes in that although they are more resistant to attack by ammonia they are still subject to deactivation by organic nitrogen compounds and therefore the charge stock still must be subjected to a preliminary hydrotreating operation to convert organic nitrogen present in the charge stock to ammonia.

Another disadvantage is that in the conventional hydrocracking processes which for the most part are practiced to convert heavy hydrocarbon distillates to lighter materials such as naphtha and kerosene for motor and jet fuels respectively, the heavy charge stocks, e.g., boiling in the gas oil range are usually also high in polynuclear aromatics. These compounds, particularly the tricyclics, have a tendency to cause deposition of carbon on the catalyst thereby preventing the charge stock from coming into contact with the catalyst resulting in reduced conversion. Even when the charge is subjected to preliminary hydrotreating, in many instances if the charge contains high concentrations of polycyclic aromatics this treatment may not be sufficient to reduce the polycyclic content of the charge to the extent necessary to prevent contamination and deactivation of the catalyst by the deposition of carbon thereon. When such deactivation occurs it becomes necessary to regenerate the catalyst by carefully burning off the carbon.

Preliminary catalytic hydrotreatment of the hydrocarbon charge is therefore an essential step in conventional commercial processes.

It is an object of the present invention to eliminate the necessity for hydrotreating the hydrocarbon charge to a hydrocracking zone. Another object is to hydrocrack charges which are high in nitrogen and polycyclic aromatic content. Another object of the invention is to carry out a hydrocracking process with a reduced volume of catalyst. A still further object of the invention is to carry out a hydrocracking process for an extended period of time without substantial deactivation of the catalyst. A still further object of the invention is to conduct a hydrocracking process in which the yield of hydrocarbon gases is minimized. These and other objects of the invention will be obvious to those skilled in the art from the following disclosure.

The charge stocks used as feed to the process of our invention are those petroleum hydrocarbon fractions boiling above about 400° F., e.g., kerosene, cycle gas oil, straight run gas oil, coker distillates, whole crude, atmospheric residua, vacuum residua, tar sand oil, shale oil, deasphalted oil and the like. Our process is particularly adapted to treating fractions containing at least 50 p.p.m. nitrogen and shows commercial applicability to hydrocrack charge stocks containing at least 100 p.p.m. nitrogen and even stocks containing more than 500 p.p.m. nitrogen. It is well adapted to handle stocks containing more than 20 volume percent polycyclic aromatics.

The hydrogen used in the process of our invention need not necessarily be pure. The hydrogen content of the hydrogenating gas should be at least about 60 percent and preferably is at least about 75 percent by volume. Particularly suitable sources of hydrogen are catalytic reformer byproduct hydrogen and hydrogen produced by the partial combustion of hydrocarbonaceous material followed by shift conversion and $CO_2$ removal.

The catalyst used in the process of our invention contains two components, a hydrogenating component supported on a cracking component. Suitable hydrogenating components comprise metals and compounds of metals of Group VIII, e.g., the noble metals particularly platinum and palladium, and the iron group metals, particularly cobalt and nickel. Advantageously, the catalyst may also contain a group VI metal, e.g., molybdenum or tungsten used in conjunction with the iron group metal. The hydrogenating component may be used either in the metallic form or in the form of a compound, e.g., the oxide, the sulfide or telluride.

The cracking component of the catalyst comprises a mixture containing from about 5 to 75 percent by weight of a modified crystalline zeolite and at least one amorphous inorganic oxide. Suitable amorphous inorganic oxides are those displaying cracking activity, such as silica, alumina, magnesia, zirconia and berylia, which may have been treated with an acidic agent such as hydrofluoric acid to impart cracking activity thereto. A preferred mixture comprises silica-alumina in a proportion ranging from 60–90 percent silica and 10–40 percent alumina.

The modified zeolite portion of the cracking component has uniform pore openings ranging from 6–15 Angstrom units, has a silica-alumina ratio of at least 2.5, e.g., 3–10, and has a reduced alkali metal content. The modified zeolite may be prepared by subjecting synthetic zeolite Y to ion exchange by contacting the zeolite several times with fresh solutions of an ammonium compound at temperatures ranging between about 100° and 250° F. until it appears that the ion exchange is substantially complete. The ion-exchanged zeolite is then washed to remove solubilized alkali metal and dried at a temperature sufficiently high to drive off ammonia. This converts the zeolite Y to the hydrogen form and reduces the alkali metal content to about 3–5 weight percent. The ion-exchanged zeolite is then calcined at a temperature of about 1,000° F. for several hours and is subjected to additional ion exchange by contact several times with fresh solutions of an ammonium salt and again washed, dried and calcined at a temperature not in excess of 1,200° F. This treatment results in a further reduction in the alkali metal content of the zeolite to less than 1 percent, usually to about 0.5 percent. It would appear that after calcination, it is possible to engage in further ion exchange with the removal of additional alkali-metal ions not removable in the initial ion exchange. Hydrocracking catalysts containing a hydrogenation component supported on a cracking component comprising at least one amorphous inorganic oxide and the twice ion exchanged, twice calcined zeolite have superior hydrocracking activity and additionally are more resistant to deactivation when brought into contact with nitrogen compounds and polycyclic aromatics. They also show good stability to steam.

The hydrocracking catalyst should also be substantially free from rare earth metals and should have a rare earth metal content below 0.5 weight percent, preferably below 0.2 weight percent. It has been found that although rare earth metals are reputed to enhance the activity and stability characteristics of cracking catalysts, their presence in a hydrocracking catalyst has been found to be undesirable.

When the hydrogenating component of the hydrocracking catalyst is a noble metal it should be present in an amount between about 0.2 and 5.0 percent by weight based on the total catalyst composite. Preferably the noble metal is present in an amount between 0.5 and 2 percent. When the hydrogenating component comprises a Group VIII metal, it should be present in an amount between about 1 and 40 percent by weight based on the total catalyst composite. If the iron group metal is the sole hydrogenating component, it may be present in an amount between about 5 and 10 percent. When a Group VI metal is used in conjunction with a Group VIII metal, the Group VI metal may be present in an amount preferably between about 5 and 30 percent. Particularly suitable catalysts are those containing between 0.5 and 2.0 weight percent noble metal and those containing between 5 and 10 percent iron group metal and between 5 and 30 percent Group VI metal. Specific examples of suitable catalysts are those containing 0.75 weight percent palladium or containing about 6 percent nickel and 20 percent tungsten on a support made-up of about 20 percent modified zeolite Y, 58 percent silica and 22 percent alumina.

The hydrogenating component is deposited on the cracking component by impregnating the latter with a solution of a compound of the hydrogenating component. Such techniques are well-known in the art and require no description here.

When used in the sulfide form the catalyst may be converted thereto by methods well-known in the art such as by subjecting the catalyst at a temperature between about 400° and 600° F. to contact with a sulfiding agent, for example hydrogen containing 10–20 percent sulfide or carbon disulfide.

In one specific embodiment of our process, the hydrocarbon charge is mixed with hydrogen and passed into contact in a first stage with a catalyst comprising a hydrogenating component supported on a mixture of a modified (twice ion exchange, twice calcined) crystalline zeolite as described above and at least one amorphous inorganic oxide at a temperature between about 650° and 850° F., a pressure between about 500 and 5,000 p.s.i.g., a liquid hourly space velocity (volume of feed per hour per volume of catalyst) between about 0.2 and 2.0 and a hydrogen rate of between about 3,000 and 15,000 standard cubic feet per barrel (s.c.f./bbl.) of feed. Preferred reaction conditions for the first stage are 675°–800° F., 1,000 –3,000 p.s.i.g., 0.5 –1.5 LHSV and 4,000–10,000 s.c.f./bbl. hydrogen.

Effluent from the first stage is sent to a high-pressure separator from which a hydrogen rich stream is removed and is recycled to the first stage reaction zone. Advantageously, to prevent the buildup of impurities, the hydrogen is subjected to scrubbing for the removal of impurities such as $H_2S$ and $NH_3$. It is also desirable to withdraw a portion of the recycle stream and replace it with makeup hydrogen which is used to replenish hydrogen consumed in the reaction. The remainder of the effluent is fractionated to recover gaseous and liquid hydrocarbons boiling up to about 400° F. The first stage may be operated to effect some hydrocracking although preferably this is minimized. Satisfactory results are obtained at about a 20 percent conversion to 400° F. and lighter material.

After fraction of the first stage effluent, the 400° F. and higher material is sent to the second stage where, in the presence of hydrogen, it is contacted again with a catalyst comprising a hydrogenating component supported on a mixture of a modified crystalline zeolite and at least one amorphous inorganic oxide. The second stage reaction is carried out at a temperature between about 500° and 775° F., a pressure between about 500 and 5,000 p.s.i.g., a space velocity between about 0.2 and 3.0 and a hydrogen rate of between about 3,000 and 15,000 s.c.f./bbl. Preferred conditions for the second stage are 500°–750° F., 1,000 –3,000 p.s.i.g., 0.75–2.0 LHSV and 4,000–10,000 s.c.f./bbl. hydrogen. Reaction conditions may be adjusted to obtain a 30–70 percent conversion to 400° F. end point material, a 50 percent conversion being preferred.

In the following example, which is given for illustrative purposes only, run A represents the process of our invention in which the catalyst in both the first and second stages contains 6.5 Ni, 19.5 W on a support composed of 21 percent modified zeolite Y, 57 percent silica and 22 percent alumina. In run B which represents a typical conventional hydrocracking process the stage 1 catalyst contains 3 wt. percent NiO and 15 wt. percent $MoO_3$ supported on alumina and the stage 2 catalyst 9 wt. percent NiS and 24 wt. percent $WS_2$ supported on a 73/27 silica/alumina base.

The charge stock is a cycle gas oil having the following characteristics:

| ASTM distillation | |
|---|---|
| I.B.P. | 392° F. |
| 50% | 626° F. |
| E.P. | 760+° F. |
| API Gravity | 28.3 |
| Total Nitrogen, p.p.m. | 100 |
| Sulfur, p.p.m. | 1800 |
| Armatocs, wt. % | 38 |

The reaction conditions, operating data and yield results are set forth in the table.

It will be noted from the above date that run A results in less gas production then the conventional process represented by run b. It will also be noted that in the first stage of run A a 20 percent conversion to 400° F. and lighter material is accomplished whereas no such conversion takes place in the first stage of run B despite the fact that in run A the first stage space velocity is 1.0 and the temperature 700° F. whereas in run B the first stage temperature is 725° F. wand the space velocity 0.75. Another feature is that the hydrocracking catalyst of the first stage of run A shows good resistance to poisoning by nitrogen and deactivation by polycyclic aromatics.

From the above data it can also be shown that for a 24,000 BPD plant, an operation corresponding to run A would call for 1,000 barrels of catalyst in the first stage and 1,574 barrels of catalyst in the second stage for a total of 2,574 barrels of catalyst whereas in the conventional process as exemplified by run B a plant of equal capacity would require 1,335 barrels of catalyst for the first stage and 2,060 barrels of catalyst for the second stage, making a total of 3,395 barrels of catalyst. Calculation shows that the process of our invention represents a 24 percent reduction in reactor volume over conventional processes and correspondingly a 24 percent reduction in the amount of catalyst necessary for a given capacity, a considerably saving in original outlay for smaller reactors and less

|  | Run A | | | Run B | | |
| --- | --- | --- | --- | --- | --- | --- |
|  | Stage 1 | Stage 2 | Total | Stage 1 | Stage 2 | Total |
| LHSV | 1.0 | 1.0 |  | 0.75 | 1.0 |  |
| Pressure, p.s.i.g | 1,500 | 1,500 |  | 1,500 | 1,500 |  |
| Temperature, °F | 700 | 610 |  | 725 | 606 |  |
| S.c.f.b. H₂ | 6,000 | 6,000 |  | 6,000 | 6,000 |  |
| Liquid recycle ratio | 0 | 1.0 |  | 0 | 1.0 |  |
| Conversion level (400° F.+) | 20 | 50 |  | 0 | 50 |  |
| Yield structure:¹ |  |  |  |  |  |  |
| C₁ weight percent |  |  |  | 0.1 | 0.3 | 0.5 |
| C₂ weight percent | 0.1 | 0.1 | 0.2 | 0.1 | 0.5 | 0.6 |
| C₃ weight percent | 0.3 | 0.8 | 1.1 | 0.1 | 2.5 | 2.6 |
| iC₄ volume percent | 1.1 | 7.4 | 8.5 | 0.1 | 12.9 | 13.0 |
| nC₄ volume percent | 0.7 | 2.1 | 2.8 | 0.1 | 3.6 | 3.7 |
| iC₅ volume percent | 1.3 | 7.7 | 9.0 | 0.1 | 12.3 | 12.3 |
| nC₅ volume percent | 0.5 | 1.5 | 2.0 |  | 3.0 | 3.0 |
| C₆-EP volume percent | ᵃ 23.4 | 71.7 | 95.1 | 103.0 | 91.7 | 91.7 |
| C₅ plus volume percent | ᵃ 25.2 | 80.9 | 106.1 |  | 107.0 | 107.0 |
| Product quality (RON plus 3 cc. TEL): |  |  |  |  |  |  |
| Light naphtha | ᵇ 95.1 (C₅-215° F.) | ᵇ 94.8 (C₅-180° F.) |  |  | 94.9 (C₅-235° F.) |  |
| Heavy naphtha | ᵇ 71.8 (215-400° F.) | ᵇ 74.1 (180-400° F.) |  |  | 72.4 (235-400° F.) |  |
| Iso C₄/nC₄ |  | 3.0 |  |  |  | 3.5 |
| Iso C₅/nC₅ |  | 4.5 |  |  |  | 4.1 |

¹ Basis fresh feed to first stage.
ᵃ Excluding feed to second stage.
ᵇ Excludes pentanes lost in light gases.

catalyst and also for reduced operating expenses.

Obviously, various modifications of the invention as hereinbefore set forth may be made without departing from the spirit and scope thereof, and therefore, only such limitations should be made as are indicated in the appended claims.

We claim:

1. A process for the hydroconversion of a petroleum hydrocarbon fraction having an initial boiling point of at least about 400°X F. and containing at least 50 p.p.m. nitrogen which comprises contacting said fraction in the absence of preliminary treatment for nitrogen removal with a hdyrocracking catalyst having a hdyrogenating component consisting essentially of a member of the group consisting of Group VIII metals, Group VI metals, their oxides, sulfides and mixtures thereof in a first stage under hydrocracking conditions to obtain a conversion to 400° F. and lighter material of at least 10 percent, removing the 400° F. and lighter material from the reactant stream, passing the 400° F. and heavier portion of the reactant stream into contact with a hydrocracking catalyst in a second stage under hydrocracking conditions and to obtain in the second stage a conversion to 400° F. and lighter material of between 30 to 70 percent, the catalysts in said first and second stages comprising a hydrogenating component supported on a mixture containing 5-75 percent by weight of a modified crystalline zeolite having uniform pore openings of 6-15 A, a silica:alumina ratio in the range 3-10 a rare earth metal content of less than 0.5 weight percent and at least one amorphous inorganic oxide and containing less than about 1 percent alkali metal.

2. The process of claim 1 in which the hydrocracking temperature in the first stage is greater than the hydrocracking temperature in the second stage.

3. The process of claim 1 in which the volume of the catalyst in the first stage is greater than the volume of the catalyst in the second stage.

4. The process of claim 1 in which the modified zeolite is prepared by subjecting zeolite Y to at least two sequences comprising ion exchange with an ammonium compound, drying and calcining.

5. The process of claim 4 in which the final calcining temperature is not greater than 1,200° F.

6. The process of claim 1 in which the component of the hydrocracking catalyst in the second stage comprises palladium. of the hydrocracking catalyst of the first stage comprises nickel and tungsten.

7. The process of claim 1 in which the hydrogenating component of the hydrocracking catalyst in the second stage comprises nickel and tungsten.

8. The process of claim 1 in which the hydrogenating component of the hydrocracking catalyst in the second stage comprises palladium.

* * * * *

PO-1050
(5/69)

UNITED STATES PATENT OFFICE
CERTIFICATE OF CORRECTION

Patent No. 3,617,483      Dated November 2, 1971

Inventor(s) Edward T. Child, Reese A. Peck and Donald A. Messing

It is certified that error appears in the above-identified patent and that said Letters Patent are hereby corrected as shown below:

Column 1, line 17, "hndrocracking" should read --hydrocracking--
           line 20, "hYdrogenating" should read --hydrogenating--
           line 22, "catalYsts" should read --catalysts--
           line 33, "itS" should read --its--
           line 52, "fRom" should read --from--

Column 2, line 10, "Is" should read --is--

Column 5, (RunA,Stage 2)"80 9' should read --80.9--

Column 4, line 58, "wand" should read --and--

Column 5, line 44, "30 to 70" should read --30 and 70--

Claim 6 should read:

The process of Claim 1 in which the hydrogenating component of the hydrocracking catalyst of the first stage comprises nickel and tungsten.

Signed and sealed this 28th day of November 1972.

(SEAL)
Attest:

EDWARD M. FLETCHER, JR.
Attesting Officer

ROBERT GOTTSCHALK
Commissioner of Patents